US012675914B2

(12) United States Patent
Liu et al.

(10) Patent No.: US 12,675,914 B2
(45) Date of Patent: Jul. 7, 2026

(54) DATA PROCESSING METHOD AND APPARATUS, COMPUTING DEVICE, AND SYSTEM

(71) Applicant: Huawei Technologies Co., Ltd., Shenzhen (CN)

(72) Inventors: Shilong Liu, Dongguan (CN); Zhi Zhu, Shenzhen (CN); Ning Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 234 days.

(21) Appl. No.: 18/436,999

(22) Filed: Feb. 8, 2024

(65) Prior Publication Data

US 2024/0177352 A1      May 30, 2024

Related U.S. Application Data

(63) Continuation of application No. PCT/CN2022/101956, filed on Jun. 28, 2022.

(30) Foreign Application Priority Data

Aug. 17, 2021    (CN) .......................... 202110943564.9

(51) Int. Cl.
*G06T 9/00* (2006.01)
*G06T 11/00* (2026.01)

(52) U.S. Cl.
CPC ................ *G06T 9/00* (2013.01); *G06T 11/00* (2013.01)

(58) Field of Classification Search
CPC ........................... G06T 9/00; G09G 2370/022
See application file for complete search history.

(56) References Cited

U.S. PATENT DOCUMENTS

2014/0292803 A1* 10/2014 Cook ...................... G06T 15/00
345/619
2021/0350601 A1* 11/2021 Chen ........................ G06T 9/40

* cited by examiner

*Primary Examiner* — Matthew Salvucci
(74) *Attorney, Agent, or Firm* — Slater Matsil, LLP

(57) ABSTRACT

This application discloses a data processing method and apparatus, a computing device, and a system, and relates to the field of remote control. The method includes: A first computing device obtains first information used by a second computing device to display a first image, where the first information includes a drawing instruction, and the drawing instruction is used to render first to-be-rendered data to obtain the first image. The first computing device determines indication information of the first to-be-rendered data, and sends second information that includes the drawing instruction and the indication information to the second computing device.

19 Claims, 9 Drawing Sheets

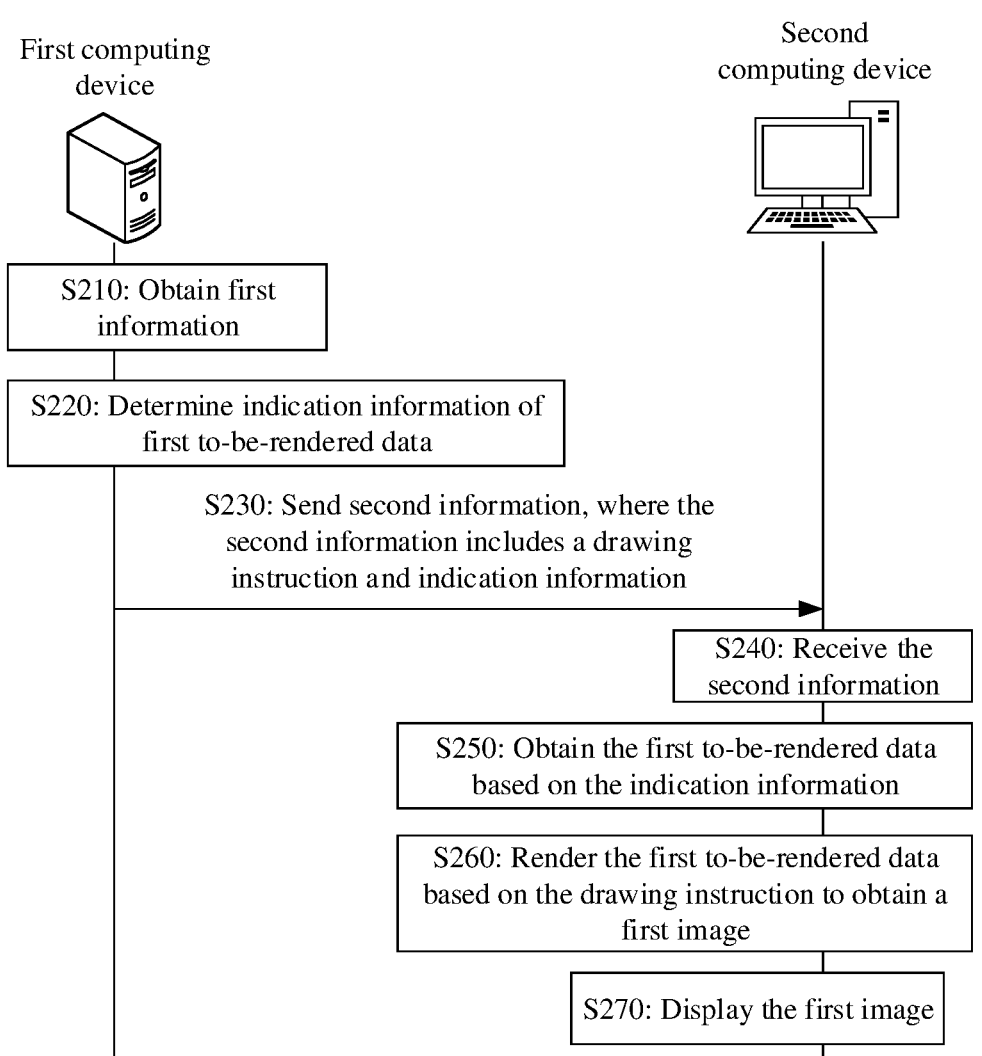

First computing
device

Second
computing device

S210: Obtain first
information

S220: Determine indication information of
first to-be-rendered data

S230: Send second information, where the
second information includes a drawing
instruction and indication information S240: Receive the
second information S250: Obtain the first to-be-rendered data
based on the indication information S260: Render the first to-be-rendered data
based on the drawing instruction to obtain a
first image S270: Display the first image

FIG. 2

DATA PROCESSING METHOD AND APPARATUS, COMPUTING DEVICE, AND SYSTEM

CROSS-REFERENCE TO RELATED APPLICATIONS

This application is a continuation of International Patent Application No. PCT/CN2022/101956, filed on Jun. 28, 2022, which claims priority to Chinese Patent Application No. 202110943564.9 filed on Aug. 17, 2021. The disclosures of the aforementioned applications are hereby incorporated by reference in their entireties.

TECHNICAL FIELD

This application relates to the field of remote control, and in particular, to a data processing method and apparatus, a computing device, and a system.

BACKGROUND

A cloud phone is a virtual phone, and a service of the cloud phone is provided by a cloud server. Usually, a cloud phone application (APP) is installed on a terminal. The terminal runs the cloud phone application and displays a cloud phone interface. The terminal may receive an operation performed by a user on the cloud phone. The cloud server may receive, through a network, an operation instruction for the cloud phone sent by the terminal. The cloud server executes the operation instruction for the cloud phone, to complete the operation on the cloud phone. The terminal may receive, through the network, a drawing instruction and to-be-rendered data that are sent by the cloud server. The terminal renders the to-be-rendered data based on the drawing instruction, so that the terminal displays an image of an operation result.

Because a data volume of information (including the drawing instruction and the to-be-rendered data) required by the terminal to display the image is large, network bandwidth required for transmitting the drawing instruction and the to-be-rendered data is also high. If the network bandwidth is low, the terminal cannot receive the drawing instruction and the to-be-rendered data in time. This causes frame freezing on the image displayed by the terminal, and deteriorates user experience. Currently, the cloud server may compress the drawing instruction and the to-be-rendered data in a general compression manner (for example, ZSTD or LZ4), and transmit compressed data to the terminal. However, compression efficiency of the general compression manner is low, a data volume of the compressed data is still large, and a delay of receiving the drawing instruction and the to-be-rendered data by the terminal is still large. Therefore, how to reduce the delay of the information required by the terminal to display the image is an urgent problem to be resolved.

SUMMARY

This application provides a data processing method and apparatus, a computing device, and a system, to reduce a delay of information required by a terminal to display an image.

According to a first aspect, a data processing method is provided, where the method is performed by a first computing device. The method includes: The first computing device obtains first information used by a second computing device to display a first image, where the first information includes a drawing instruction, and the drawing instruction is used to render first to-be-rendered data to obtain the first image. Before the first computing device sends the drawing instruction to the second computing device, the first computing device determines indication information of the first to-be-rendered data, and sends second information that includes the drawing instruction and the indication information to the second computing device. The indication information includes a first indication or a second indication, where the first indication is used to identify the first to-be-rendered data previously sent by the first computing device to the second computing device, and the second indication is used to identify compressed data that is of the first to-be-rendered data and that is currently sent by the first computing device to the second computing device.

In this way, the first computing device uses the indication information of the to-be-rendered data to indicate to-be-rendered data that needs to be repeatedly transmitted, to avoid repeated transmission of same to-be-rendered data. Therefore, a data volume of the to-be-rendered data carried in the drawing instruction is reduced, bandwidth and a delay of data transmission are reduced, and the second computing device can obtain, in time, information required for displaying an image to display the image, to improve user experience.

In a possible implementation, determining the indication information of the first to-be-rendered data includes: The first computing device determines the indication information based on a sending record, where the sending record indicates the to-be-rendered data that has been sent by the first computing device to the second computing device. In this way, the first computing device determines, based on the sending record, whether to-be-sent to-be-rendered data has been transmitted. If the to-be-sent to-be-rendered data has been transmitted, the first computing device determines indication information of the to-be-rendered data, to avoid repeated transmission of same to-be-rendered data, to reduce a data volume of the to-be-rendered data carried in the drawing instruction.

For example, determining the indication information of the first to-be-rendered data includes: The first computing device obtains an identifier of the first to-be-rendered data, and determines the indication information by comparing the identifier of the first to-be-rendered data with an identifier of the to-be-rendered data included in the sending record.

The first computing device may determine, based on the sending record, that the first computing device has previously sent the first to-be-rendered data to the second computing device, or that the first computing device has not previously sent the first to-be-rendered data to the second computing device. In different scenarios, the indication information may include different content.

Example 1: Determining the indication information by comparing the identifier of the first to-be-rendered data with the identifier of the to-be-rendered data included in the sending record includes: If the sending record includes the identifier of the first to-be-rendered data, the first computing device includes the identifier of the first to-be-rendered data in the indication information. In this way, the first computing device performs mapping processing on the to-be-rendered data that needs to be repeatedly transmitted, and includes the identifier of the first to-be-rendered data in the indication information that is sent to the second computing device, to avoid repeated transmission of same to-be-rendered data. Therefore, a data volume of the to-be-rendered data carried in the drawing instruction is reduced, bandwidth and a delay of transmitting information required by the second computing device to display an image are reduced, and the second computing device can obtain, in time, the information required for displaying the image to display the image, to improve user experience.

Example 2: Determining the indication information by comparing the identifier of the first to-be-rendered data with the identifier of the to-be-rendered data included in the sending record includes: If the sending record does not include the identifier of the first to-be-rendered data, the first computing device determines, based on an identifier of second to-be-rendered data included in the sending record, differential data between the first to-be-rendered data and the second to-be-rendered data, and includes the identifier of the second to-be-rendered data and the differential data in the indication information. In this way, the first computing device performs deduplication processing on the to-be-rendered data that needs to be repeatedly transmitted, and includes the identifier of the second to-be-rendered data and the differential data in the indication information that is sent to the second computing device, to avoid repeated transmission of same to-be-rendered data. Therefore, a data volume of the to-be-rendered data carried in the drawing instruction is reduced, bandwidth and a delay of transmitting information required by the second computing device to display an image are reduced, and the second computing device can obtain, in time, the information required for displaying the image to display the image, to improve user experience.

Example 3: Determining the indication information by comparing the identifier of the first to-be-rendered data with the identifier of the to-be-rendered data included in the sending record includes: If the sending record does not include the identifier of the first to-be-rendered data, the first computing device compresses the first to-be-rendered data to obtain compressed data, and includes the compressed data in the indication information. In this way, for the first to-be-rendered data that has not been transmitted, compression processing is performed on the first to-be-rendered data, and the compressed data of the first to-be-rendered data is transmitted to the second computing device. Therefore, a data volume of the to-be-rendered data carried in the drawing instruction is reduced, bandwidth and a delay of transmitting information required by the second computing device to display an image are reduced, and the second computing device can obtain, in time, the information required for displaying the image to display the image, to improve user experience.

In another possible implementation, after the sending the second information to the second computing device, the method further includes: The first computing device updates the sending record, where the sending record includes the identifier of the first to-be-rendered data. In this way, when sending the first to-be-rendered data again, the first computing device may determine, based on the identifier of the first to-be-rendered data included in the sending record, that the first to-be-rendered data has been sent to the second computing device, to avoid repeated sending.

The first to-be-rendered data includes at least one of texture data and vertex data.

In another possible implementation, obtaining the first information includes: The first computing device receives an operation indication sent by the second computing device, and obtains the first information based on the operation indication. For example, the operation indication indicates an operation on a cloud application running on the second computing device.

In another possible implementation, after the sending second information to the second computing device, the method further includes: The first computing device deletes, according to an aging rule, the to-be-rendered data indicated by the sending record, and sends a deletion indication to the second computing device. The aging rule is used to limit an amount of the to-be-rendered data indicated by the sending record. The deletion indication indicates the to-be-rendered data to be deleted by the second computing device. In this way, the first computing device is prevented from buffering data infinitely and wasting storage space of a memory.

According to a second aspect, a data processing method is provided, where the method is performed by a second computing device. The method includes: The second computing device receives second information that is sent by a first computing device and that includes a drawing instruction and indication information, obtains first to-be-rendered data based on the indication information, renders the first to-be-rendered data based on the drawing instruction to obtain a first image, and displays the first image. The second information indicates the second computing device to display the first image. The indication information includes a first indication or a second indication, where the first indication is used to identify the first to-be-rendered data previously sent by the first computing device to the second computing device, and the second indication is used to identify compressed data that is of the first to-be-rendered data and that is currently sent by the first computing device to the second computing device.

In this way, the second computing device locally obtains the to-be-rendered data based on the indication information of the to-be-rendered data, to avoid repeated transmission of same to-be-rendered data. Therefore, a data volume of the to-be-rendered data carried in the drawing instruction is reduced, bandwidth and a delay of data transmission are reduced, and the second computing device can obtain, in time, information required for displaying an image to display the image, to improve user experience.

Example 1: If the indication information includes an identifier of the first to-be-rendered data, obtaining the first to-be-rendered data based on the indication information includes: The second computing device obtains the first to-be-rendered data based on the identifier of the first to-be-rendered data and a receiving record, where the receiving record indicates the to-be-rendered data that has been received by the second computing device and that has been previously sent by the first computing device. In this way, the second computing device stores the received to-be-rendered data, to avoid repeated transmission of same to-be-rendered data. Therefore, a data volume of the to-be-rendered data carried in the drawing instruction is reduced, bandwidth and a delay of transmitting information required by the second computing device to display an image are reduced, and the second computing device locally obtains, as quickly as possible, the information required for displaying the image to display the image, to improve user experience.

Example 2: If the indication information includes an identifier of second to-be-rendered data and differential data of the second to-be-rendered data, obtaining the first to-be-rendered data based on the indication information includes: The second computing device obtains the second to-be-rendered data based on the identifier of the second to-be-rendered data and a receiving record, and obtains the first to-be-rendered data based on same data in the second to-be-rendered data and the first to-be-rendered data and the differential data, where the first to-be-rendered data includes the differential data and the same data. In this way, the second computing device locally obtains the first to-be-rendered data based on the differential data, so that the second computing device locally obtains, as quickly as possible, information required for displaying an image to display the image, to improve user experience.

Example 3: If the indication information includes the compressed data, obtaining the first to-be-rendered data based on the indication information includes: The second computing device decompresses the compressed data to obtain the first to-be-rendered data.

In a possible implementation, the second computing device updates the receiving record, where the receiving record includes the first to-be-rendered data and the identifier of the first to-be-rendered data. In this way, when receiving the identifier of the first to-be-rendered data again, the second computing device may query the receiving record based on the identifier of the first to-be-rendered data to determine that the first to-be-rendered data has been received, to locally obtain the first to-be-rendered data.

In another possible implementation, after the displaying the first image, the method further includes: The second computing device receives a deletion indication sent by the first computing device, and deletes the stored to-be-rendered data based on the deletion indication. The deletion indication indicates the to-be-rendered data to be deleted by the second computing device. In this way, the second computing device is prevented from buffering data infinitely and wasting storage space of a memory.

According to a third aspect, a data processing apparatus is provided. The apparatus includes modules configured to perform the data processing method according to any one of the first aspect or the possible designs of the first aspect, or modules configured to perform the data processing method according to any one of the second aspect or the possible designs of the second aspect.

According to a fourth aspect, a computing device is provided. The computing device includes at least one processor and a memory, where the memory is configured to store a group of computer instructions. When the processor is used as an execution device according to any one of the first aspect or the possible implementations of the first aspect to execute the group of computer instructions, the processor performs operation steps of the data processing method according to any one of the first aspect or the possible implementations of the first aspect.

According to a fifth aspect, a computing device is provided. The computing device includes at least one processor, a memory, and a display, where the memory is configured to store a group of computer instructions. When the processor is used as an execution device according to any one of the second aspect or the possible implementations of the second aspect to execute the group of computer instructions, the processor performs operation steps of the data processing method according to any one of the second aspect or the possible implementations of the second aspect, so that the display displays an image.

According to a sixth aspect, a computer-readable storage medium is provided, where the computer-readable storage medium includes computer software instructions. When the computer software instructions are run on a computing device, the computing device is enabled to perform operation steps of the method according to any one of the first aspect or the possible implementations of the first aspect, or perform operation steps of the method according to any one of the second aspect or the possible implementations of the second aspect.

According to a seventh aspect, a computer program product is provided. When the computer program product runs on a computer, a computing device is enabled to perform operation steps of the method according to any one of the first aspect or the possible implementations of the first aspect, or perform operation steps of the method according to any one of the second aspect or the possible implementations of the second aspect.

In this application, based on the implementations provided in the foregoing aspects, the implementations may be further combined to provide more implementations.

BRIEF DESCRIPTION OF THE DRAWINGS

FIG. 2 is a flowchart of a data processing method according to this application;

DETAILED DESCRIPTION OF ILLUSTRATIVE EMBODIMENTS

Figure 1:
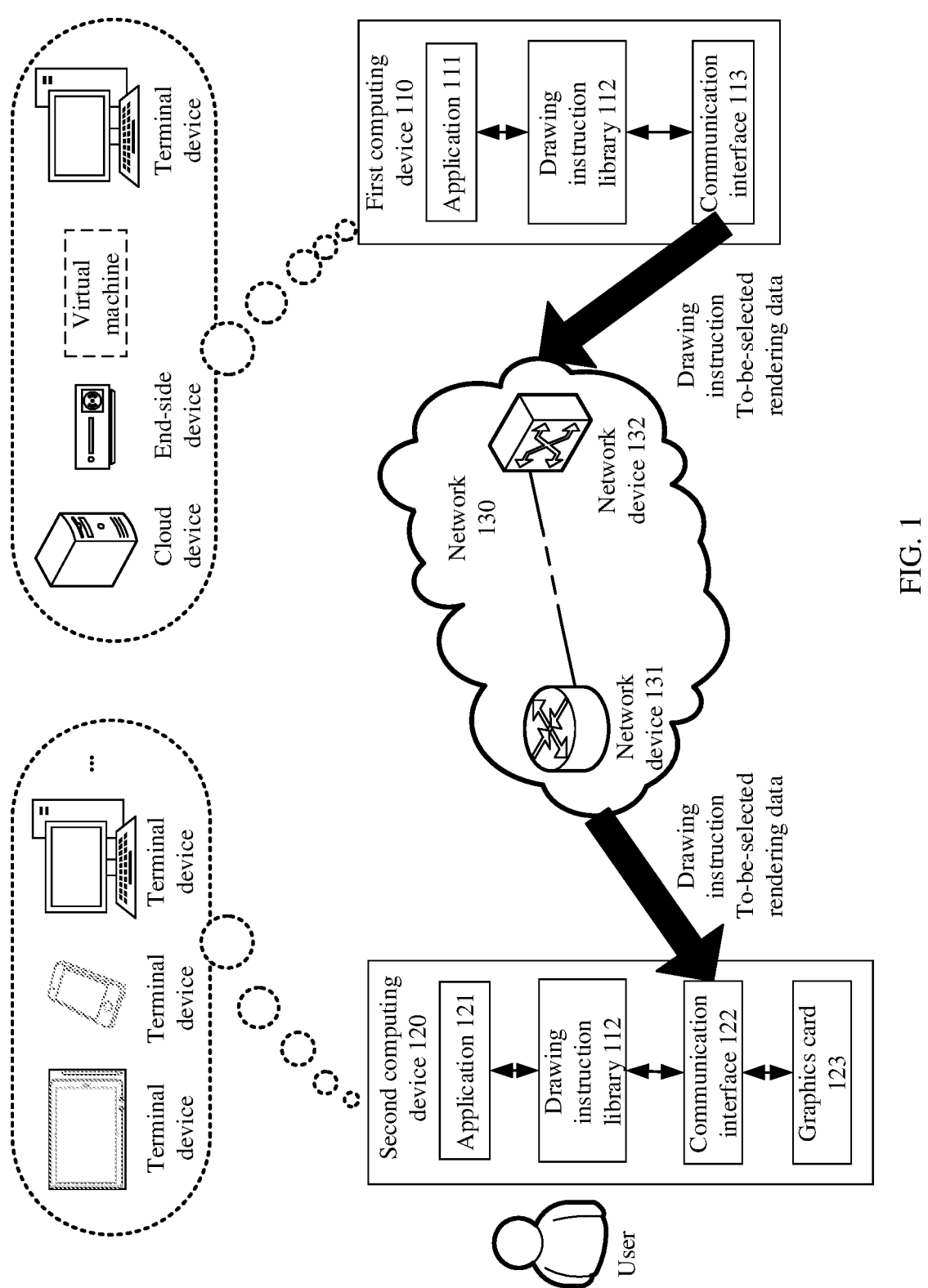
FIG. 1 is a schematic diagram of a structure of a system according to this application.

A data processing method provided in embodiments of this application is mainly applied to a remote image display scenario based on a drawing instruction (Graphic API). To be specific, a first computing device (for example, a server) sends a drawing instruction that carries to-be-rendered data to a second computing device (for example, a terminal), so that the second computing device displays an image described by the to-be-rendered data after rendering the to-be-rendered data based on the drawing instruction. For example, the terminal displays a game scenario and a game character of a cloud game. For another example, after receiving an operation performed by a user on a cloud mobile phone, the terminal displays an image of an operation result. For another example, in a remote desktop scenario, a second computer remotely controls a first computer, and the second computer displays an interface of the first computer.

Rendering is a process in which a computer generates an image based on a drawing instruction and to-be-rendered data, for example, rendering of a game scenario and a game character in game development. For another example, in audio and video development, data obtained after video encoding is rendered to implement a filter effect.

The to-be-rendered data includes, for example, geometric data, vertex data, texture data, and lighting data of an object.

The to-be-rendered data includes description information of the object by using a computer language or a data structure.

The drawing instruction includes an open graphics library (OpenGL), an open graphics library for embedded systems (OpenGL ES), a cross-platform 2D and 3D drawing application interface (Vulkan), a Windows multimedia programming interface (Direct eXtension, DirectX), and an iOS rendering application programming interface (Metal).

The OpenGL is a cross-platform and cross-language rendering application programming interface for rendering 2D or 3D vector graphics. Computer resources are abstracted as OpenGL objects and the OpenGL objects are manipulated based on OpenGL instructions, so that simple two-dimensional graphics are transformed into complex three-dimensional images.

The OpenGL ES is a subset of the OpenGL, and is mainly designed for smart terminals (such as mobile phones), tablet computers, and game hosts. For example, the OpenGL ES does not include a complex diagram element instruction such as a begin/end (glBegin/glEnd) instruction, a quadrilateral (GL_QUADS) instruction, and a polygon (GL_POLYGONS) instruction.

For example, FIG. 1 is a schematic diagram of a structure of a system according to an embodiment of this application. As shown in FIG. 1, the system includes a first computing device 110 and a second computing device 120. The first computing device 110 and the second computing device 120 transmit data through a network 130. The first computing device 110 may be a physical device. For example, the first computing device 110 may be a cloud device or an end-side device. The first computing device 110 may alternatively be a virtual machine (VM) on a physical device. The second computing device 120 may be a mobile phone terminal, a tablet computer, a notebook computer, a virtual reality (VR) device, an augmented reality (AR) device, a mixed reality (MR) device, an extended reality (ER) device, a vehicle-mounted terminal, or the like. The network 130 may refer to an interconnection network.

Both the first computing device 110 and the second computing device 120 are preset with a drawing instruction library 112, have a capability of executing a drawing instruction, and implement remote image display by transmitting the drawing instruction.

The first computing device 110 further includes an application 111 and a communication interface 113. After running the application 111, the first computing device 110 may invoke the drawing instruction in the drawing instruction library 112, and send the drawing instruction and to-be-selected rendering data to the second computing device 120 through the communication interface 113.

The second computing device 120 receives the drawing instruction and the to-be-selected rendering data through a communication interface 122, and transmits the drawing instruction and the to-be-selected rendering data to a graphics card 123. The graphics card 123 renders the to-be-rendered data by using the drawing instruction to obtain a displayed image, that is, a running result of running the application 111 by the first computing device 110. The second computing device 120 may further include an application 121.

In an example, the first computing device 110 and the second computing device 120 may be devices that support running of a cloud phone. The first computing device 110 is a server configured to manage the cloud phone. The second computing device 120 is a terminal on which a cloud mobile phone application (for example, the application 121) is installed.

An application (for example, a game client) that is the same as that of a physical mobile phone may be installed on the cloud mobile phone. The application 111 run by the first computing device 110 may be an application installed on the cloud phone, and the application 111 is, for example, a game program. A user may operate the cloud mobile phone in a same manner as operating the physical mobile phone. For example, the user performs an operation on a game interface on the cloud mobile phone of the second computing device 120. The first computing device 110 receives an operation instruction sent by the second computing device 120, and the first computing device 110 runs the operation instruction to obtain an operation result. The first computing device 110 sends, to the second computing device 120 through the communication interface 113, the drawing instruction that carries the to-be-rendered data. The second computing device 120 receives, through the communication interface 122, the drawing instruction that carries the to-be-rendered data, and renders, by using the drawing instruction, the to-be-rendered data to display an operation result image.

In another example, the first computing device 110 is a server running a cloud game. The second computing device 120 is a terminal on which a cloud game application (for example, the application 121) is installed. After a user performs an operation on a cloud game interface displayed by the second computing device 120, the second computing device 120 receives, through the communication interface 122, the drawing instruction that is sent by the first computing device 110 and that carries the to-be-rendered data, and renders, by using the drawing instruction, the to-be-rendered data to display an operation result image.

However, because a data volume of information (including the drawing instruction and the to-be-rendered data) required by the terminal to display the image is large, if network bandwidth is low, a delay of transmitting the information required for displaying the image is large. As a result, the terminal may not receive the drawing instruction and the to-be-rendered data in time, and this causes frame freezing on the image displayed by the terminal, and deteriorates user experience. In a scenario in which the terminal displays a game interface (for example, a cloud game), and in a scenario in which the terminal displays, based on a drawing instruction stream, a game interface that dynamically changes, a phenomenon of display frame freezing is especially obvious. According to the data processing method provided in embodiments of this application, to-be-rendered data that needs to be repeatedly transmitted is processed, to avoid repeated transmission of same to-be-rendered data. Therefore, a data volume of the to-be-rendered data carried in the drawing instruction is reduced, bandwidth and a delay of transmitting the information required by the terminal to display the image are reduced, and the terminal can obtain, in time, the information required for displaying the image to display the image, to improve user experience.

The following describes in detail the data processing method provided in embodiments of this application with reference to FIG. 2 to FIG. 6. Herein, an example in which the first computing device is a server configured to provide a drawing instruction for remotely displaying an image, and the second computing device is a terminal configured to display the image by using the drawing instruction provided by the server is used for description. FIG. 2 is a flowchart of a data processing method according to an embodiment of this application. As shown in FIG. 2, the method may include the following steps.

S210: A first computing device obtains first information.

The first information indicates a second computing device to display a first image. The first information includes a drawing instruction, and the drawing instruction is used to render first to-be-rendered data to obtain the first image.

In a possible example, the first computing device may actively obtain the first information, and push the first information to the second computing device, so that the second computing device displays the actively pushed first image.

In another possible example, after receiving an operation indication sent by the second computing device, the first computing device passively obtains the first information based on the operation indication.

S220: The first computing device determines indication information of the first to-be-rendered data.

After sending the to-be-rendered data to the second computing device, the first computing device stores related information about the to-be-rendered data in a main memory of the first computing device. For example, the main memory of the first computing device stores a sending record. The sending record indicates the to-be-rendered data that has been sent by the first computing device to the second computing device. For example, the sending record includes an identifier of the to-be-rendered data. The identifier of the to-be-rendered data is used to uniquely identify the to-be-rendered data. Different identifiers of the to-be-rendered data indicate different to-be-rendered data sent by the first computing device to the second computing device. The identifier of the to-be-rendered data may be obtained by the first computing device by performing a hash operation on the to-be-rendered data.

The first computing device may determine the indication information of the first to-be-rendered data based on the sending record. The first computing device notifies, by using the indication information, the second computing device whether the first to-be-rendered data has been previously transmitted, so that the second computing device obtains the first to-be-rendered data based on the indication information. For example, the indication information includes a first indication or a second indication. The first indication is used to identify the first to-be-rendered data previously sent by the first computing device to the second computing device. It may be understood that the first computing device has previously sent the first to-be-rendered data or some data of the first to-be-rendered data to the second computing device. The second indication is used to identify compressed data that is of the first to-be-rendered data and that is currently sent by the first computing device to the second computing device. It may be understood that the first computing device has not previously sent the first to-be-rendered data to the second computing device, and the first computing device sends the first to-be-rendered data to the second computing device for the first time.

In some embodiments, two bits may be used to represent the indication information. For example, if a value of the two bits is "00", it indicates that the first computing device has not previously sent the first to-be-rendered data to the second computing device. If a value of the two bits is "01", it indicates that the first computing device has previously sent the first to-be-rendered data to the second computing device. If a value of the two bits is "10", it indicates that the first computing device has previously sent some data of the first to-be-rendered data to the second computing device.

Figure 3:
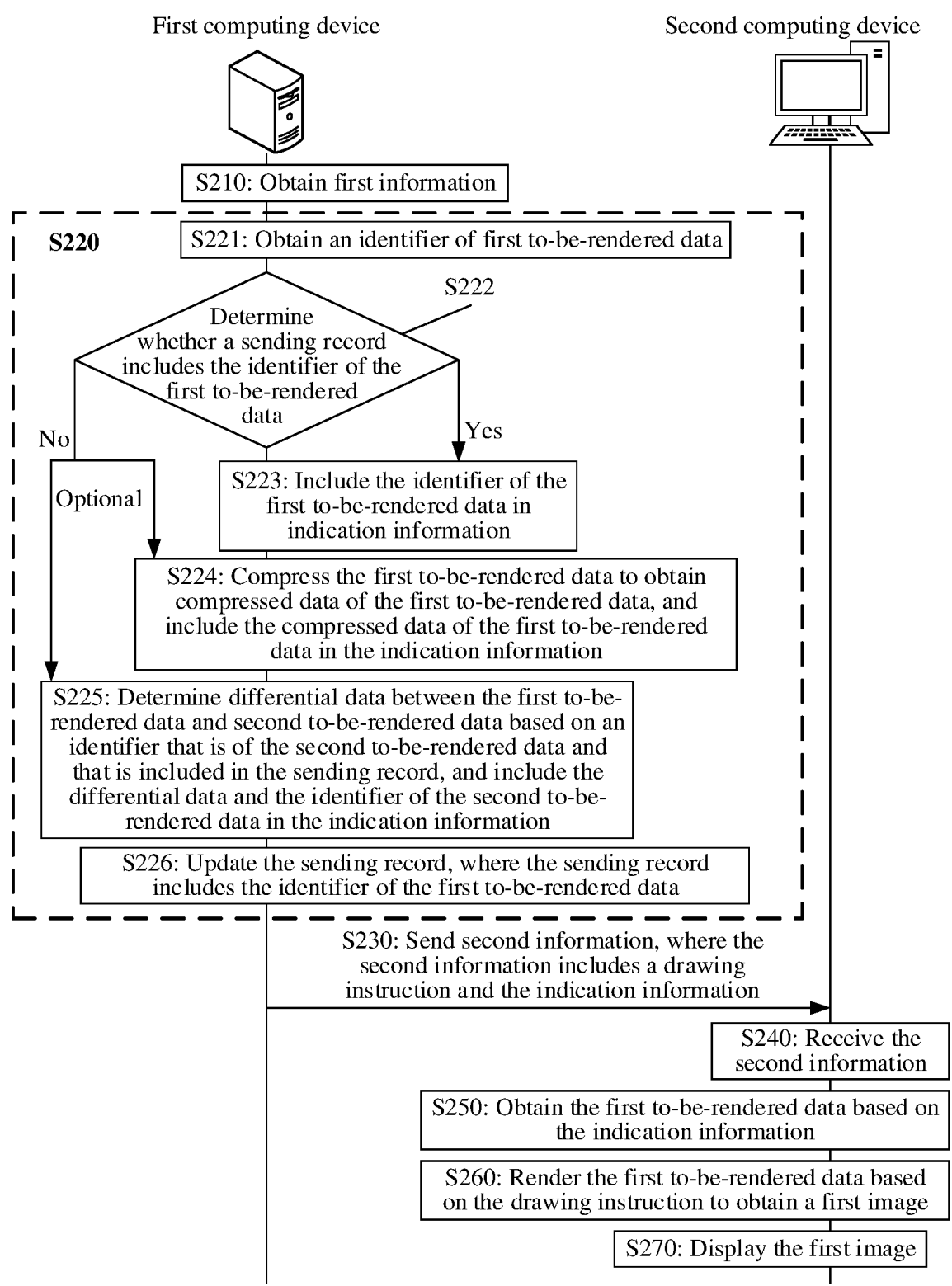
FIG. 3 is a flowchart of another data processing method according to this application.

A method procedure shown in FIG. 3 is a description of a specific operation process included in S220 in FIG. 2.

S221: The first computing device obtains an identifier of the first to-be-rendered data.

The identifier of the first to-be-rendered data is used to uniquely identify the first to-be-rendered data. The first computing device may perform a hash operation on the first to-be-rendered data, to obtain the identifier of the first to-be-rendered data. The first computing device may alternatively perform an operation on the first to-be-rendered data by using an MD5 algorithm or an SHA256 algorithm, to obtain the identifier of the first to-be-rendered data. The first computing device may alternatively obtain some data of the first to-be-rendered data according to a preset rule, and use the some data as the identifier of the first to-be-rendered data. For example, the preset rule may refer to the $1^{st}$ bit to the $N^{th}$ bit in the to-be-rendered data, and the first computing device generates the identifier of the first to-be-rendered data based on the $1^{st}$ to the $N^{th}$ bits in the to-be-rendered data. For another example, the preset rule may refer to vertex data or texture data in the to-be-rendered data, and the first computing device generates the identifier of the first to-be-rendered data based on the vertex data or the texture data in the to-be-rendered data.

S222: The first computing device determines whether the sending record includes the identifier of the first to-be-rendered data.

The first computing device determines whether the sending record includes the identifier of the first to-be-rendered data by comparing the identifier of the first to-be-rendered data with the identifier of the to-be-rendered data included in the sending record, and determines the indication information.

If the sending record includes the identifier of the first to-be-rendered data, it indicates that the first computing device has sent the first to-be-rendered data to the second computing device, and S223 is performed.

If the sending record does not include the identifier of the first to-be-rendered data, it indicates that the first computing device has not sent the first to-be-rendered data to the second computing device, and S224 is performed.

Optionally, if the sending record does not include the identifier of the first to-be-rendered data, the first computing device may further determine differential data between the first to-be-rendered data and the to-be-rendered data that has been sent, and transmit the differential data to the second computing device, and S225 is performed. For example, in a cloud game scenario, backgrounds in two frames of pictures are the same, but locations of characters are different. In this case, differential data between to-be-rendered data in the two frames of pictures may be location coordinates of the characters.

S223: The first computing device includes the identifier of the first to-be-rendered data in the indication information.

In this way, the first computing device performs mapping processing on the to-be-rendered data that needs to be repeatedly transmitted, and includes the identifier of the first to-be-rendered data in the indication information that is sent to the second computing device, to avoid repeated transmission of same to-be-rendered data. Therefore, a data volume of the to-be-rendered data carried in the drawing instruction is reduced, bandwidth and a delay of transmitting information required by the second computing device to display an image are reduced, and the second computing device can obtain, in time, the information required for displaying the image to display the image, to improve user experience.

S224: The first computing device compresses the first to-be-rendered data to obtain compressed data of the first to-be-rendered data, and includes the compressed data of the first to-be-rendered data in the indication information.

The first computing device may compress the first to-be-rendered data by using a ZSTD or JPEG compression algorithm, to obtain the compressed data of the first to-be-rendered data.

In this way, for the first to-be-rendered data that has not been transmitted, compression processing is performed on the first to-be-rendered data, and the compressed data of the first to-be-rendered data is transmitted to the second computing device. Therefore, a data volume of the to-be-rendered data carried in the drawing instruction is reduced, bandwidth and a delay of transmitting information required by the second computing device to display an image are reduced, and the second computing device can obtain, in time, the information required for displaying the image to display the image, to improve user experience.

S225: The first computing device determines differential data between the first to-be-rendered data and second to-be-rendered data based on an identifier that is of the second to-be-rendered data and that is included in the sending record, and includes the differential data and the identifier of the second to-be-rendered data in the indication information.

The first computing device may determine a variance based on at least one frame of the to-be-rendered data that has been sent and the first to-be-rendered data, where the variance indicates a difference between two frames of the to-be-rendered data; and obtain differential data based on the first to-be-rendered data and to-be-rendered data that has a smallest variance with the first to-be-rendered data. The differential data includes at least one of vertex data and texture data in the to-be-rendered data.

The second to-be-rendered data may be data that has been sent before the first to-be-rendered data that is currently to be sent. In an image represented by the to-be-rendered data recorded in the sending record, an image represented by the second to-be-rendered data may be an image most similar to an image represented by the first to-be-rendered data. The first computing device may determine the differential data that is in the first to-be-rendered data and that is different from the second to-be-rendered data. For example, in a cloud game scenario, a background environment image on a game interface remains unchanged, and a game character image changes. The differential data may refer to rendering data of a changed game character.

For example, the sending record includes a correspondence between the identifier of the to-be-rendered data and a storage address of the to-be-rendered data, so that the first computing device obtains the storage address of the to-be-rendered data based on the identifier of the to-be-rendered data, obtains the first to-be-rendered data based on the storage address of the to-be-rendered data, and determines the differential data between the first to-be-rendered data and the second to-be-rendered data.

In this way, the first computing device performs deduplication processing on the to-be-rendered data that needs to be repeatedly transmitted, and includes the identifier of the second to-be-rendered data and the differential data in the indication information that is sent to the second computing device, to avoid repeated transmission of same to-be-rendered data. Therefore, a data volume of the to-be-rendered data carried in the drawing instruction is reduced, bandwidth and a delay of transmitting information required by the second computing device to display an image are reduced, and the second computing device can obtain, in time, the information required for displaying the image to display the image, to improve user experience.

After performing S224 and S225, the first computing device may further perform S226. S226: The first computing device updates the sending record, where the sending record includes the identifier of the first to-be-rendered data.

The first computing device may store the identifier of the first to-be-rendered data, the first to-be-rendered data, and a size of the first to-be-rendered data in the main memory.

In this way, when sending the first to-be-rendered data again, the first computing device may determine, based on the identifier of the first to-be-rendered data, that the first to-be-rendered data has been sent to the second computing device, to avoid repeated sending.

It should be noted that the to-be-rendered data transmitted for remote image display includes a large amount of texture data and vertex data. Because texture data and vertex data in to-be-rendered data carried in different drawing instructions in a drawing instruction stream change slightly, the texture data and the vertex data may be repeatedly transmitted. According to the data processing method provided in this embodiment of this application, the mapping processing or the deduplication processing is performed on the to-be-rendered data, so that same to-be-rendered data needs to be transmitted only once, and only an identifier of the to-be-rendered data or differential data between the to-be-rendered data and other to-be-rendered data needs to be transmitted during retransmission, so that a volume of transmitted data is reduced and a requirement on network bandwidth is reduced. It may be understood that the first to-be-rendered data includes at least one of the texture data and the vertex data.

Textures in computer graphics include both a texture on a surface of an object in a general sense, that is, a groove that enables the surface of the object to be rough, and a color pattern (which may also be referred to as a pattern) on a smooth surface of the object. For the pattern, the color pattern or the pattern is drawn on the surface of the object, and the surface of the object is still smooth after the texture is generated. For the groove, the color pattern or the pattern is drawn on the surface, and a visual sense of concaveness is required. The texture data includes groove data and pattern data. The vertex data may be a set of graphic coordinates.

S230: The first computing device sends second information to the second computing device, where the second information includes the drawing instruction and the indication information.

The first computing device may transmit the second information to the second computing device through a network. The second information indicates the second computing device to display the first image.

S240: The second computing device receives the second information sent by the first computing device.

S250: The second computing device obtains the first to-be-rendered data based on the indication information.

After receiving the to-be-rendered data and the identifier of the to-be-rendered data that are sent by the first computing device, the second computing device stores the to-be-rendered data and the identifier of the to-be-rendered data in a main memory of the second computing device. For example, the main memory of the second computing device stores a receiving record. The receiving record indicates the to-be-rendered data that has been received by the second computing device and that has been previously sent by the first computing device. For example, the receiving record includes a correspondence between the identifier of the to-be-rendered data and the to-be-rendered data. For another example, the receiving record includes a correspondence between the identifier of the to-be-rendered data and a storage location of the to-be-rendered data, so that the second computing device locally obtains the to-be-rendered data based on the correspondence between the identifier of the to-be-rendered data and the storage location of the to-be-rendered data. Different identifiers of the to-be-rendered data indicate different to-be-rendered data that has been received by the second computing device and that has been previously sent by the first computing device.

After receiving the second information sent by the first computing device, the second computing device may obtain the first to-be-rendered data based on the indication information included in the second information, and render the first to-be-rendered data based on the drawing instruction to obtain the first image. The second information includes the drawing instruction and the indication information. The indication information includes a first indication or a second indication. The first indication is used to identify the first to-be-rendered data previously sent by the first computing device to the second computing device. The second indication is used to identify the compressed data that is of the first to-be-rendered data and that is currently sent by the first computing device to the second computing device. For specific explanations of the first indication and the second indication, refer to descriptions of S220.

Figure 4A:
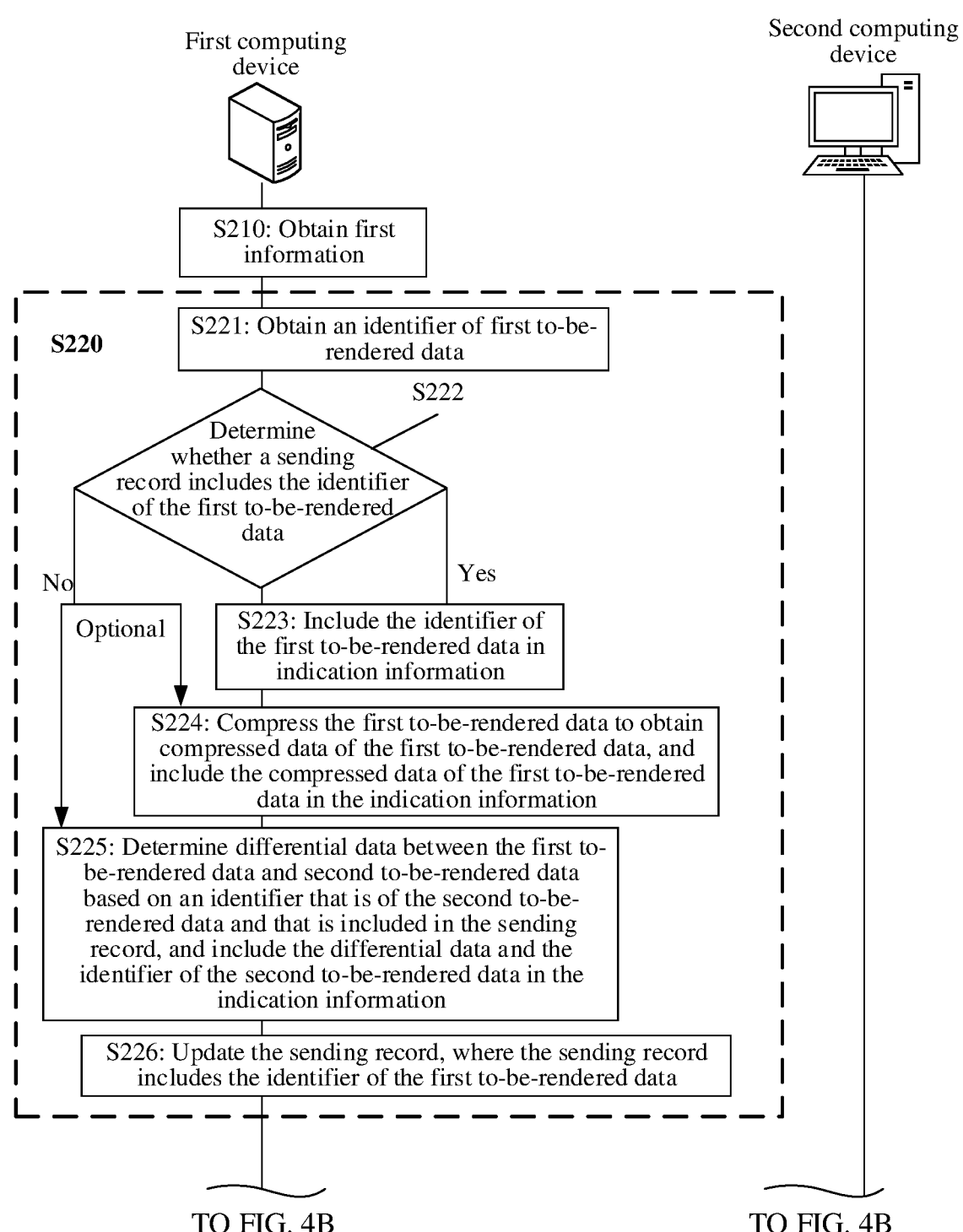
FIG. 4A and FIG. 4B are a flowchart of another data processing method according to this application.
Figure 4B:
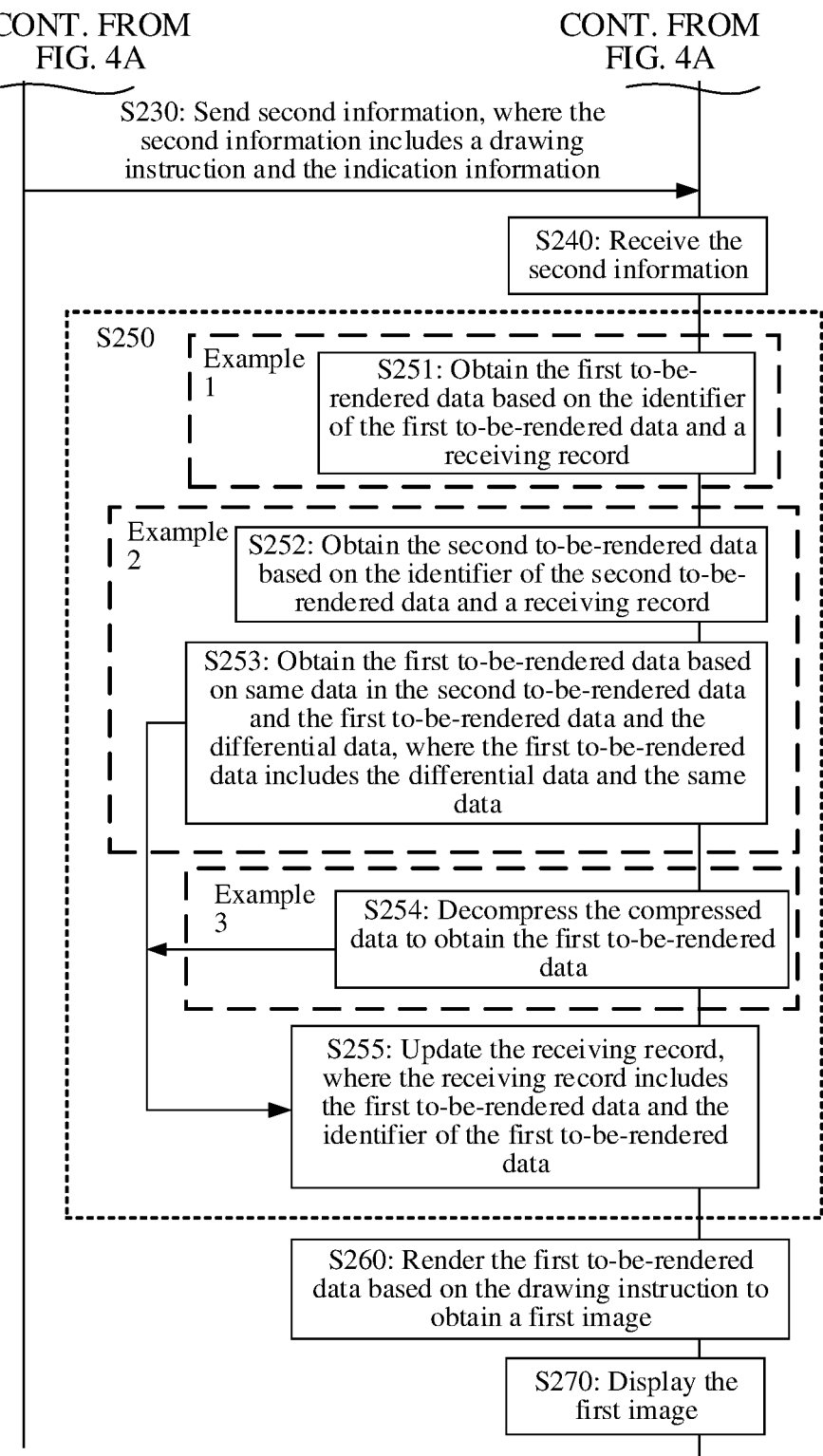

A method procedure shown in FIG. 4A and FIG. 4B is a description of a specific operation process included in S250 in FIG. 2.

In a first example, if the indication information includes the identifier of the first to-be-rendered data, S251 is performed.

S251: The second computing device obtains the first to-be-rendered data based on the identifier of the first to-be-rendered data and the receiving record.

The second computing device obtains the to-be-rendered data corresponding to the identifier that is of the to-be-rendered data, that is in the receiving record, and that is the same as the identifier of the first to-be-rendered data by comparing the identifier that is of the first to-be-rendered data and that is included in the indication information with the identifier that is of the to-be-rendered data and that is included in the receiving record. If the receiving record includes the identifier of the first to-be-rendered data and the first to-be-rendered data, it indicates that the second computing device has previously received the first to-be-rendered data, and the second computing device hits a cache, and may obtain the first to-be-rendered data from the main memory. In this way, the second computing device stores the received to-be-rendered data, to avoid repeated transmission of same to-be-rendered data. Therefore, a data volume of the to-be-rendered data carried in the drawing instruction is reduced, bandwidth and a delay of transmitting information required by the second computing device to display an image are reduced, and the second computing device locally obtains, as quickly as possible, the information required for displaying the image to display the image, to improve user experience.

In a second example, if the indication information includes the differential data between the first to-be-rendered data and the second to-be-rendered data, and the identifier of the second to-be-rendered data, S252 and S253 are performed.

S252: The second computing device obtains the second to-be-rendered data based on the identifier of the second to-be-rendered data and the receiving record.

The second computing device obtains the to-be-rendered data corresponding to the identifier that is of the to-be-rendered data, that is in the receiving record, and that is the same as the identifier of the second to-be-rendered data by comparing the identifier that is of the second to-be-rendered data and that is included in the indication information with the identifier that is of the to-be-rendered data and that is included in the receiving record. If the receiving record includes the identifier of the second to-be-rendered data and the second to-be-rendered data, it indicates that the second computing device has previously received the second to-be-rendered data, and the second computing device hits a cache, and may obtain the second to-be-rendered data from the main memory.

S253: The second computing device obtains the first to-be-rendered data based on same data in the second to-be-rendered data and the first to-be-rendered data and the differential data, where the first to-be-rendered data includes the differential data and the same data.

The second computing device obtains, from the second to-be-rendered data, data different from the differential data, that is, obtains the same data in the second to-be-rendered data and the first to-be-rendered data, and combines the same data and the differential data to obtain the first to-be-rendered data.

In a third example, if the indication information includes the compressed data, S254 is performed.

S254: The second computing device decompresses the compressed data to obtain the first to-be-rendered data.

The second computing device may decompress the compressed data by using the ZSTD or JPEG compression algorithm, to obtain the first to-be-rendered data.

It should be noted that, if the indication information does not include the identifier of the first to-be-rendered data, it indicates that the second computing device has not previously received the first to-be-rendered data, and after obtaining the first to-be-rendered data by using the method described in S253 or S254, the second computing device performs S255.

S255: The second computing device updates the receiving record, where the receiving record includes the first to-be-rendered data and the identifier of the first to-be-rendered data.

In this way, when receiving the identifier of the first to-be-rendered data again, the second computing device may determine, based on the identifier of the first to-be-rendered data, that the first to-be-rendered data has been received, to locally obtain the first to-be-rendered data.

S260: The second computing device renders the first to-be-rendered data based on the drawing instruction to obtain the first image.

The drawing instruction may include glTexImage2D, glTexSubImage2D, glTexImage3D, glTexSubImage3D, and glBufferData.

glTexImage2D, glTexSubImage2D, glTexImage3D, and glTexSubImage3D are used to attach textures to graphics. glBufferData is used to render vertices of the graphics.

In a process in which the second computing device renders the first to-be-rendered data based on the drawing instruction to obtain the first image, the drawing instruction includes both an instruction for processing the vertex data and the texture data, and some other instructions, for example, a drawing instruction for setting and processing a vertex shader, a fragment shader, and a frame buffer.

For example, rendering a to-be-displayed image by using an OpenGL instruction requires execution of a plurality of instructions, and rendering the to-be-rendered data based on the drawing instruction is a process of state superposition.

S270: The second computing device displays the first image.

According to the data processing method provided in this embodiment of this application, the first computing device performs the mapping processing or the deduplication processing on the to-be-rendered data, and transmits the processed data, to avoid repeated transmission of same to-be-rendered data. Therefore, traffic consumption of the to-be-rendered data is reduced, a requirement on network bandwidth is reduced, and the second computing device can obtain, in time, information required for displaying the image to display the image, to improve user experience.

Optionally, the first computing device may further compress the drawing instruction and the indication information to obtain the second information. The second computing device first decompresses the second information to obtain the drawing instruction and the indication information. Further, the second computing device obtains the first to-be-rendered data based on the indication information, renders the first to-be-rendered data based on the drawing instruction to obtain the first image, and displays the first image. Therefore, the data volume and the traffic consumption of the to-be-rendered data are further reduced, and the requirement on the network bandwidth is reduced.

Figure 5:
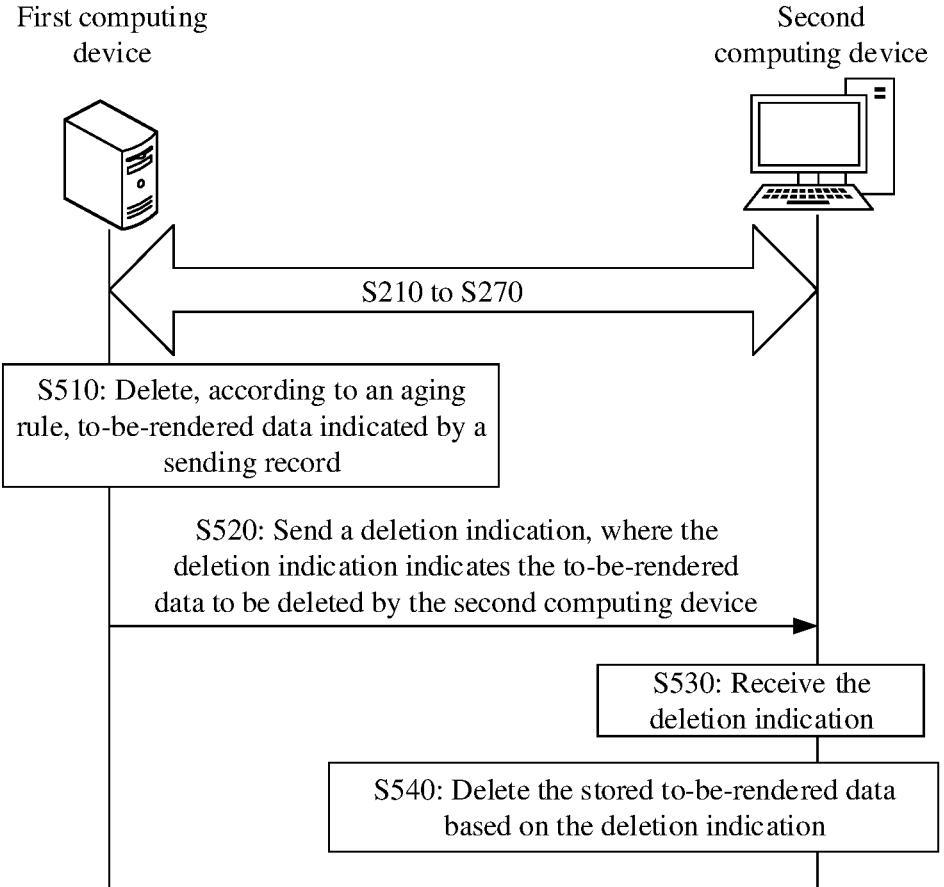
FIG. 5 is a flowchart of another data processing method according to this application.

In some other embodiments, to avoid buffering excessive to-be-rendered data, an aging rule may be used to clear the to-be-rendered data. As shown in FIG. 5, after S210 to S270, this embodiment of this application further includes the following steps.

S510: The first computing device deletes, according to an aging rule, the to-be-rendered data indicated by the sending record.

The aging rule is used to limit an amount of the to-be-rendered data indicated by the sending record. The first computing device may clear, based on a threshold indicated by the aging rule, the to-be-rendered data indicated by the sending record. The threshold may be a value related to a data volume or a value related to time.

For example, after sending the to-be-rendered data to the second computing device, the first computing device may record a size of the to-be-rendered data. When a data volume of the to-be-rendered data stored in the first computing device is greater than a preset data volume, the first computing device deletes the to-be-rendered data whose data volume is greater than the preset data volume and the identifier of the to-be-rendered data. For example, the first computing device may delete to-be-rendered data that is sent earliest and an identifier of the to-be-rendered data.

For another example, after sending the to-be-rendered data to the second computing device, the first computing device may record a time point at which the to-be-rendered data is sent. When duration in which the first computing device stores to-be-rendered data is greater than preset duration, the first computing device deletes the to-be-rendered data whose storage duration is greater than the preset duration and an identifier of the to-be-rendered data.

S520: The first computing device sends a deletion indication to the second computing device, where the deletion indication indicates the to-be-rendered data to be deleted by the second computing device.

The deletion indication may include the identifier of the to-be-rendered data.

S530: The second computing device receives the deletion indication sent by the first computing device.

S540: The second computing device deletes the stored to-be-rendered data based on the deletion indication.

The second computing device queries the receiving record based on the identifier that is of the to-be-rendered data and that is included in the deletion indication, and deletes the identifier of the to-be-rendered data and the to-be-rendered data indicated by the identifier of the to-be-rendered data. In this way, the first computing device and the second computing device are prevented from buffering data infinitely and wasting storage space of a memory.

The following uses an example to describe a process of remotely displaying an image provided in this embodiment of this application. For example, as shown in (a) in FIG. 6, in a cloud game scenario, a server 610 actively obtains a drawing instruction and first to-be-rendered data, where the first to-be-rendered data is used to describe a game character selection image, that is, a first image may be a game character selection scenario image. The server 610 sends the drawing instruction and indication information of the first to-be-rendered data to a terminal 620. The terminal 620 obtains the first to-be-rendered data based on the indication information of the first to-be-rendered data, and renders the first to-be-rendered data based on the drawing instruction to obtain the game character selection image. The terminal 620 displays a game character selection interface 621.

Figure 6:
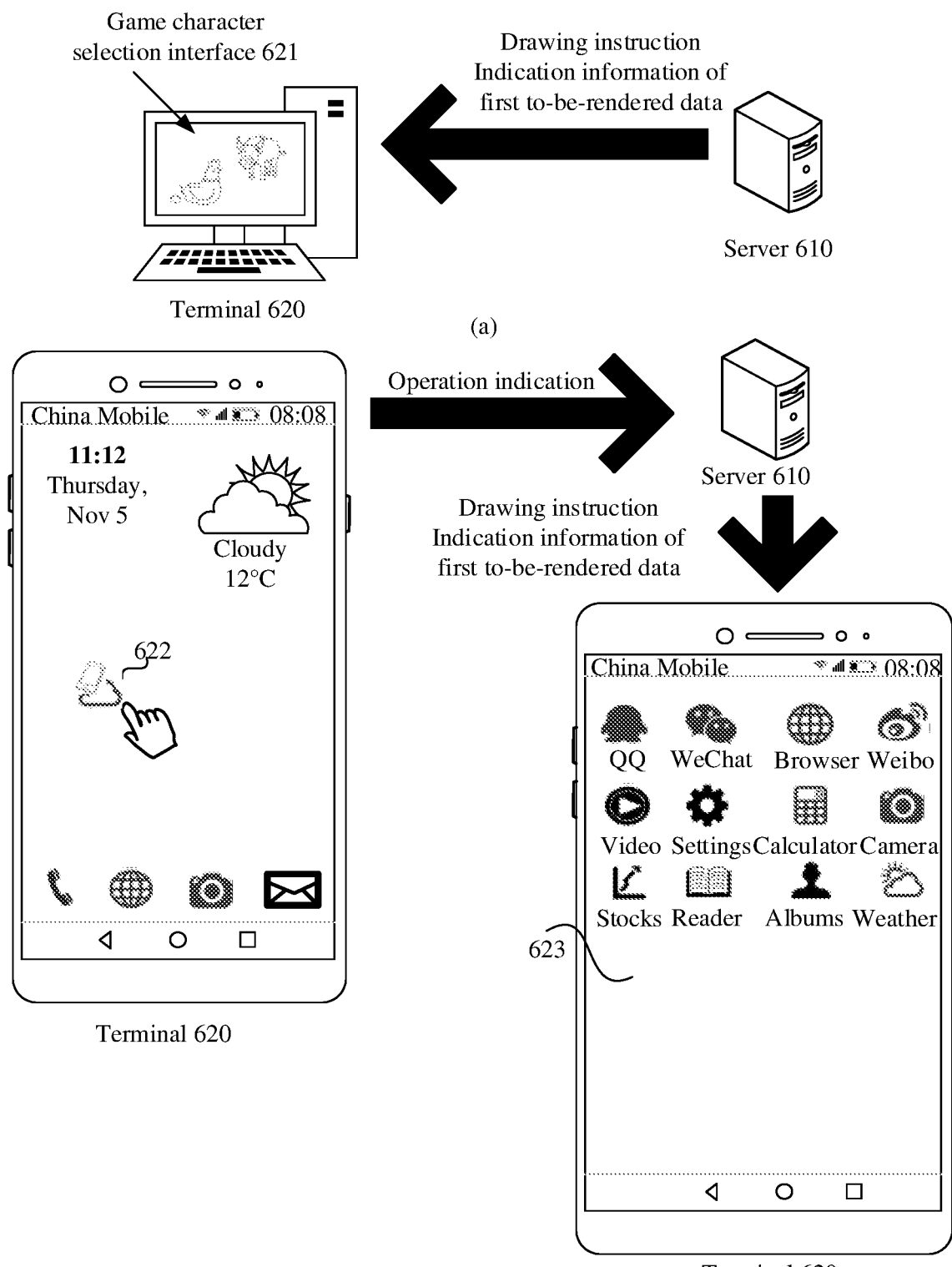
FIG. 6 is a schematic diagram of an image display process according to this application.

For example, as shown in (b) in FIG. 6, in a cloud mobile phone scenario, a cloud mobile phone APP icon 622 is displayed on a display screen of a terminal 620. A user may tap the cloud mobile phone APP icon 622, and in response to a tap operation, the terminal 620 runs a cloud mobile phone application, and sends an operation indication to a server 610. The terminal 620 receives a drawing instruction and indication information of first to-be-rendered data that are sent by the server 610, where the first to-be-rendered data is used to describe a user interface image of a cloud mobile phone APP, that is, a first image may be the user interface image of the cloud mobile phone APP. The terminal 620 obtains the first to-be-rendered data based on the indication information of the first to-be-rendered data, and renders the first to-be-rendered data based on the drawing instruction to obtain the user interface image of the cloud mobile phone APP. The terminal 620 displays a user interface 623 of the cloud mobile phone APP.

It may be understood that, to implement functions in the foregoing embodiments, the computing device includes corresponding hardware structures and/or software modules for performing the functions. A person skilled in the art should be easily aware that, in combination with the units and the method steps in the examples described in embodiments disclosed in this application, this application can be implemented by using hardware or a combination of hardware and computer software. Whether a function is performed by using hardware or hardware driven by computer software depends on particular application scenarios and design constraints of the technical solutions.

The foregoing describes in detail the data processing method provided in embodiments with reference to FIG. 1 to FIG. 6. The following describes a data processing apparatus provided in embodiments with reference to FIG. 7 and FIG. 8.

Figure 7:
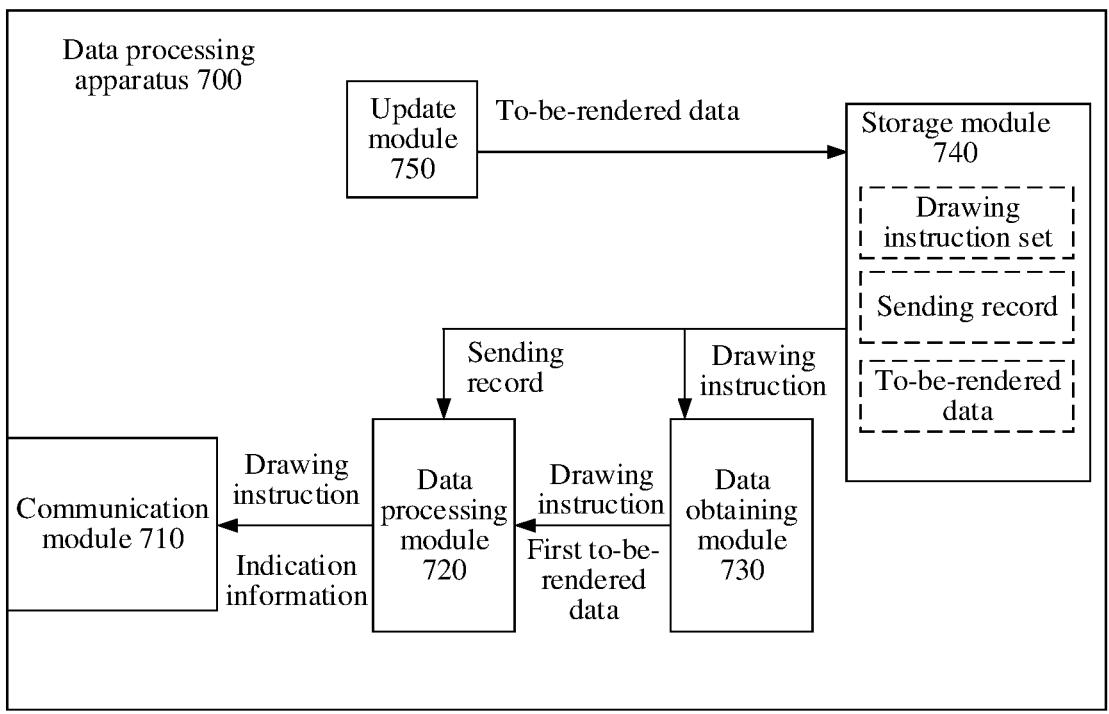
FIG. 7 is a schematic diagram of a structure of a data processing apparatus according to this application.

FIG. 7 is a schematic diagram of a structure of a possible data processing apparatus according to an embodiment. The data processing apparatus may be configured to implement functions of the first computing device in the foregoing method embodiments. Therefore, the data processing apparatus can also implement beneficial effects of the foregoing method embodiments. In this embodiment, the data processing apparatus may be the first computing device 110 shown in FIG. 1, or may be a module (for example, a chip) used in a server.

As shown in FIG. 7, a data processing apparatus 700 includes a communication module 710, a data processing module 720, a data obtaining module 730, and a storage module 740. The data processing apparatus 700 is configured to implement a function of the first computing device in the method embodiments shown in FIG. 2, FIG. 3, FIG. 4A and FIG. 4B, or FIG. 5.

The data obtaining module 730 is configured to obtain first information, where the first information indicates a second computing device to display a first image, the first information includes a drawing instruction, and the drawing instruction is used to render first to-be-rendered data to obtain the first image. For example, the data obtaining module 730 is configured to perform S210 in FIG. 2, FIG. 3, FIG. 4A and FIG. 4B, or FIG. 5.

The data processing module 720 is configured to determine indication information of the first to-be-rendered data, where the indication information includes a first indication or a second indication, the first indication is used to identify the first to-be-rendered data previously sent by the first computing device to the second computing device, and the second indication is used to identify compressed data that is of the first to-be-rendered data and that is currently sent by the first computing device to the second computing device. For example, the data processing module 720 is configured to perform S220 in FIG. 2, FIG. 3, FIG. 4A and FIG. 4B, or FIG. 5. Optionally, the data processing module 720 may further perform S510 in FIG. 5.

The communication module 710 is configured to send second information to the second computing device, where the second information includes the drawing instruction and the indication information. For example, the communication module 710 is configured to perform S230 in FIG. 2, FIG. 3, FIG. 4A and FIG. 4B, or FIG. 5. Optionally, the communication module 710 may further perform S520 in FIG. 5.

The storage module 740 is configured to store a drawing instruction set, a sending record, and to-be-rendered data, so that the data obtaining module 730 obtains the drawing instruction required for rendering the to-be-rendered data.

The data processing module 720 is specifically configured to determine the indication information based on the sending record, where the sending record indicates the to-be-rendered data that has been sent by the first computing device to the second computing device.

For example, the data processing module 720 obtains an identifier of the first to-be-rendered data; and determines the indication information by comparing the identifier of the first to-be-rendered data with an identifier of the to-be-rendered data included in the sending record.

The data processing module 720 is specifically configured to: if the sending record includes the identifier of the first to-be-rendered data, include the identifier of the first to-be-rendered data in the indication information.

The data processing module 720 is specifically configured to: if the sending record does not include the identifier of the first to-be-rendered data, determine, based on an identifier that is of second to-be-rendered data and that is included in the sending record, differential data between the first to-be-rendered data and the second to-be-rendered data, and include the identifier of the second to-be-rendered data and the differential data in the indication information.

The data processing module 720 is specifically configured to: if the sending record does not include the identifier of the first to-be-rendered data, compress the first to-be-rendered data to obtain the compressed data, and include the compressed data in the indication information.

The data processing apparatus 700 further includes an update module 750. The update module 750 is configured to update the sending record.

Figure 8:
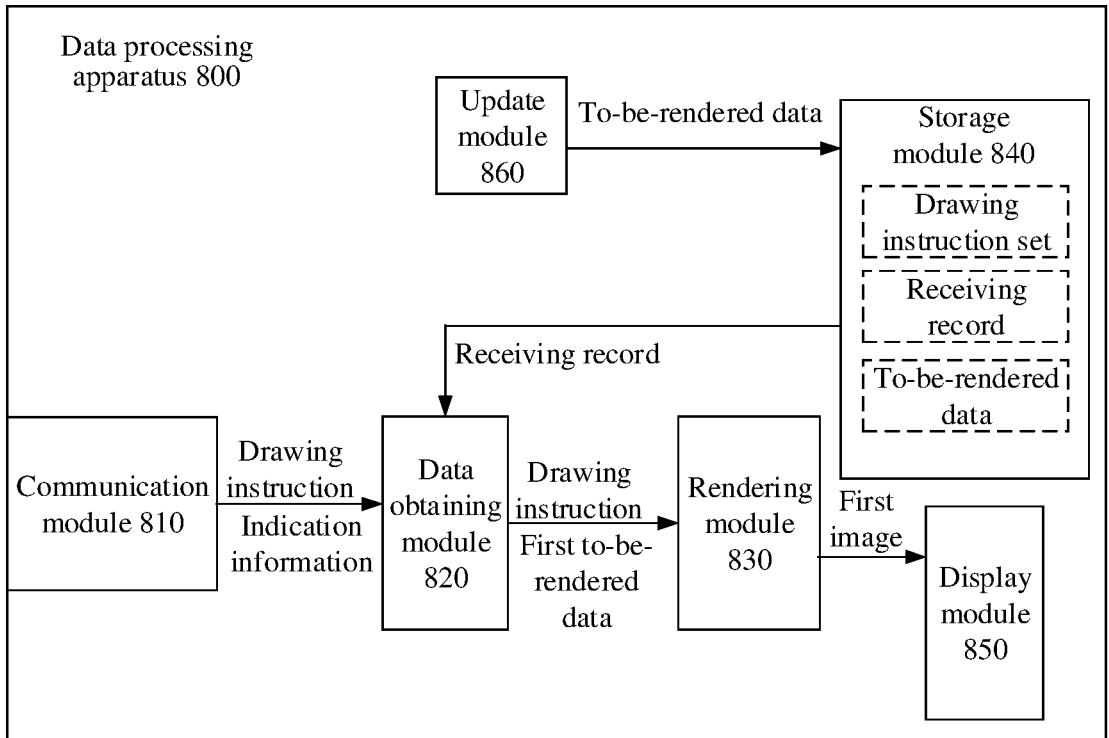
FIG. 8 is a schematic diagram of a structure of another data processing apparatus according to this application.

FIG. 8 is a schematic diagram of a structure of a possible data processing apparatus according to an embodiment. The data processing apparatus may be configured to implement functions of the second computing device in the foregoing method embodiments. Therefore, the data processing apparatus can also implement beneficial effects of the foregoing method embodiments. In this embodiment, the data processing apparatus may be the second computing device 120 shown in FIG. 1, or may be a module (for example, a chip) used in a server.

As shown in FIG. 8, a data processing apparatus 800 includes a communication module 810, a data obtaining module 820, a rendering module 830, and a storage module 840. The data processing apparatus 800 is configured to implement a function of the second computing device in the method embodiments shown in FIG. 2, FIG. 3, FIG. 4A and FIG. 4B, or FIG. 5.

The communication module 810 is configured to receive second information sent by a first computing device, where the second information includes a drawing instruction and indication information, the second information indicates the second computing device to display a first image, and the indication information includes a first indication or a second indication, where the first indication is used to identify first to-be-rendered data previously sent by the first computing device to the second computing device, and the second indication is used to identify compressed data that is of the first to-be-rendered data and that is currently sent by the first computing device to the second computing device. For example, the communication module 810 is configured to perform S240 in FIG. 2, FIG. 3, FIG. 4A and FIG. 4B, or FIG. 5. Optionally, the communication module 810 may further perform S530 in FIG. 5.

The data obtaining module 820 is configured to obtain the first to-be-rendered data based on the indication information. For example, the data obtaining module 820 is configured to perform S250 in FIG. 2, FIG. 3, FIG. 4A and FIG. 4B, or FIG. 5. Optionally, the data obtaining module 820 may further perform S540 in FIG. 5.

The rendering module 830 is configured to render the first to-be-rendered data based on the drawing instruction to obtain the first image. For example, the rendering module 830 is configured to perform S260 in FIG. 2, FIG. 3, FIG. 4A and FIG. 4B, or FIG. 5.

The storage module 840 is configured to store a drawing instruction set, a receiving record, and to-be-rendered data, so that the data obtaining module 820 obtains the first to-be-rendered data based on the indication information.

The data obtaining module 820 is specifically configured to obtain the first to-be-rendered data based on an identifier of the first to-be-rendered data and the receiving record, where the receiving record indicates the to-be-rendered data that has been received by the second computing device and that has been previously sent by the first computing device.

The data obtaining module 820 is specifically configured to: obtain second to-be-rendered data based on an identifier of the second to-be-rendered data and the receiving record, and obtain the first to-be-rendered data based on same data in the second to-be-rendered data and the first to-be-rendered data and differential data, where the first to-be-rendered data includes the differential data and the same data.

The data obtaining module 820 is specifically configured to decompress the compressed data to obtain the first to-be-rendered data.

The data processing apparatus 800 further includes a display module 850 and an update module 860.

The display module 850 is configured to display the first image obtained by rendering the first to-be-rendered data by using the drawing instruction. For example, the display module 850 is configured to perform S270 in FIG. 2, FIG. 3, FIG. 4A and FIG. 4B, or FIG. 5.

The update module 860 is configured to update the receiving record.

It should be understood that the data processing apparatus 700 or the data processing apparatus 800 in embodiments of this application may be implemented by using an application-specific integrated circuit (ASIC) or a programmable logic device (PLD). The PLD may be a complex programmable logical device (CPLD), a field-programmable gate array (FPGA), a generic array logic (GAL), or any combination thereof. Alternatively, when the data processing method shown in FIG. 2, FIG. 3, FIG. 4A and FIG. 4B, or FIG. 5 may be implemented by using software, the data processing apparatus 700 and modules of the data processing apparatus 700 may be software modules, and the data processing apparatus 800 and modules of the data processing apparatus 800 may be software modules.

The data processing apparatus 700 or the data processing apparatus 800 according to embodiments of this application may correspondingly perform the method described in embodiments of this application, and the foregoing and other operations and/or functions of the units in the data processing apparatus 700 or the data processing apparatus 800 are respectively used to implement corresponding procedures of the method in FIG. 2, FIG. 3, FIG. 4A and FIG. 4B, or FIG. 5. For brevity, details are not described herein again.

Figure 9:
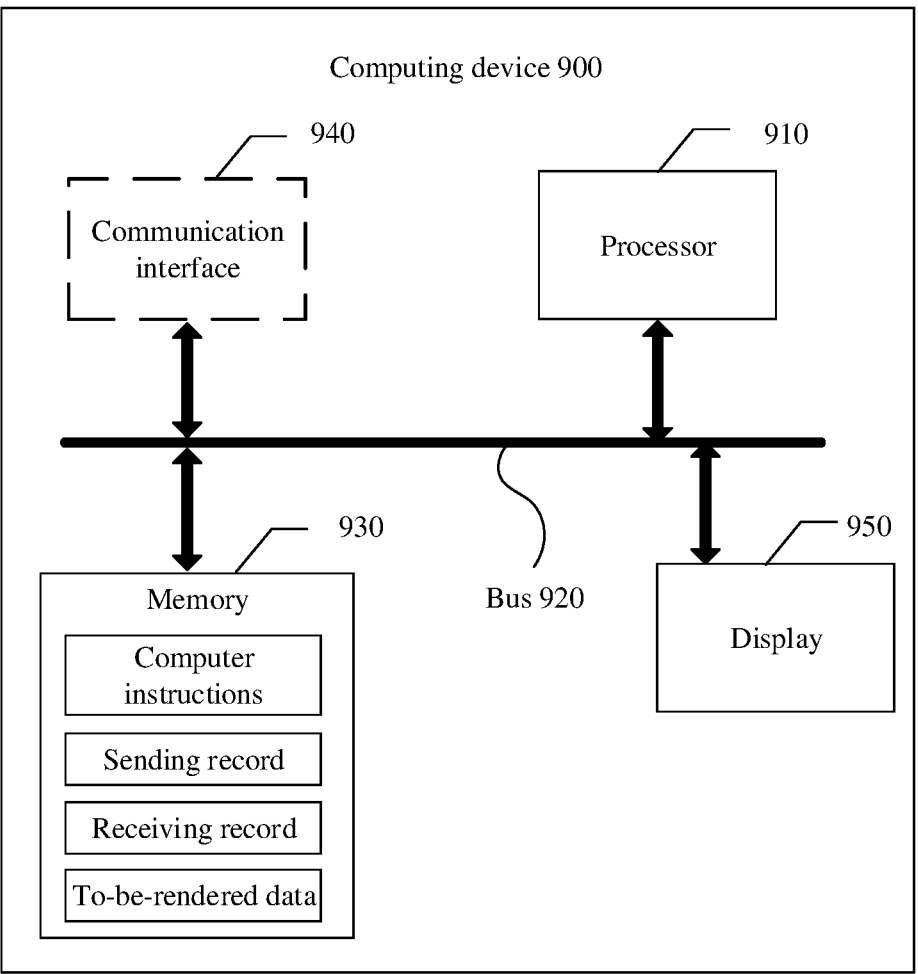
FIG. 9 is a schematic diagram of a structure of a computing device according to this application.

FIG. 9 is a schematic diagram of a structure of a computing device 900 according to an embodiment. As shown in the figure, the computing device 900 includes a processor 910, a bus 920, a memory 930, and a communication interface 940.

It should be understood that, in this embodiment, the processor 910 may be a CPU, or the processor 910 may be another general-purpose processor, a digital signal processor (DSP), an ASIC, an FPGA or another programmable logic device, a discrete gate or transistor logic device, a discrete hardware component, or the like. The general-purpose processor may be a microprocessor, any conventional processor, or the like.

Alternatively, the processor may be a graphics processing unit (GPU), a neural network processing unit (NPU), a microprocessor, an ASIC, or one or more integrated circuits configured to control program execution in the solutions of this application.

The communication interface 940 is configured to implement communication between the computing device 900 and an external device or component. In this embodiment, when the computing device 900 is configured to implement a function of the first computing device 110 shown in FIG. 1, the communication interface 940 is configured to send a drawing instruction and indication information. When the computing device 900 is configured to implement a function of the second computing device 120 shown in FIG. 1, the communication interface 940 is configured to receive a drawing instruction and indication information.

The bus 920 may include a path, configured to transmit information between the foregoing components (for example, the processor 910 and the memory 930). In addition to a data bus, the bus 920 may further include a power bus, a control bus, a status signal bus, and the like. However, for clear description, various types of buses in the figure are marked as the bus 920.

In an example, the computing device 900 may include a plurality of processors. The processor may be a multi-core (multi-CPU) processor. The processor herein may be one or more devices, circuits, and/or computing units configured to process data (for example, computer program instructions). In this embodiment, when the computing device 900 is configured to implement the function of the first computing device 110 shown in FIG. 1, the processor 910 may invoke a sending record stored in the memory 930 to determine the indication information. When the computing device 900 is configured to implement the function of the second computing device 120 shown in FIG. 1, the processor 910 may invoke a receiving record stored in the memory 930 to determine to-be-rendered data.

Optionally, when the computing device 900 is configured to implement the function of the second computing device 120 shown in FIG. 1, the computing device 900 further includes a display 950. The display 950 is configured to display a first image that is obtained by rendering first to-be-rendered data by using the drawing instruction.

It should be noted that only an example in which the computing device 900 includes one processor 910 and one memory 930 is used in FIG. 9. Herein, the processor 910 and the memory 930 are separately configured to indicate a type of component or device. In a specific embodiment, a quantity of components or devices of each type may be determined based on a service requirement.

The memory 930 may correspond to a storage medium that is configured to store information such as computer instructions, the to-be-rendered data, the sending record, and the receiving record in the foregoing method embodiments, for example, a magnetic disk, such as a mechanical hard disk or a solid state drive.

The computing device 900 may be a general-purpose device or a dedicated device. For example, the computing device 900 may be a mobile phone terminal, a tablet computer, a notebook computer, a VR device, an AR device, an MR device, an ER device, a vehicle-mounted computing device, or the like, or may be an edge device (for example, a box carrying a chip that has a processing capability), or the like. Optionally, the computing device 900 may alternatively be a server or another device that has a computing capability.

It should be understood that the computing device 900 according to this embodiment may correspond to the data processing apparatus 700 or the data processing apparatus 800 in the embodiments, and may correspond to a corresponding body that performs any method in FIG. 2, FIG. 3, FIG. 4A and FIG. 4B, or FIG. 5. In addition, the foregoing and other operations and/or functions of the modules in the data processing apparatus 700 or the data processing apparatus 800 are respectively used to implement corresponding procedures of the method in FIG. 2, FIG. 3, FIG. 4A and FIG. 4B, or FIG. 5. For brevity, details are not described herein again.

The method steps in embodiments may be implemented by hardware, or may be implemented by a processor executing software instructions. The software instructions may include a corresponding software module. The software module may be stored in a random access memory (RAM), a flash memory, a read-only memory (ROM), a programmable read-only memory (PROM), an erasable programmable read-only memory (EPROM), an electrically erasable programmable read-only memory (EEPROM), a register, a hard disk, a removable hard disk, a CD-ROM, or any other form of storage medium well-known in the art. For example, the storage medium is coupled to the processor, so that the processor can read information from the storage medium and write information into the storage medium. Certainly, the storage medium may be a component of the processor. The processor and the storage medium may be located in an ASIC. In addition, the ASIC may be located in a computing device. Certainly, the processor and the storage medium may alternatively exist in the computing device as discrete components.

All or some of the foregoing embodiments may be implemented by using software, hardware, firmware, or any combination thereof. When the software is used to implement embodiments, all or some of embodiments may be implemented in a form of a computer program product. The computer program product includes one or more computer programs or instructions. When the computer programs or instructions are loaded and executed on a computer, all or some of the procedures or the functions in embodiments of this application are executed. The computer may be a general-purpose computer, a dedicated computer, a computer network, a network device, user equipment, or another programmable apparatus. The computer programs or instructions may be stored in a computer-readable storage medium, or may be transmitted from a computer-readable storage medium to another computer-readable storage medium. For example, the computer programs or instructions may be transmitted from a website, computer, server, or data center to another website, computer, server, or data center in a wired or wireless manner. The computer-readable storage medium may be any usable medium that can be accessed by a computer, or a data storage device, such as a server or a data center, integrating one or more usable media. The usable medium may be a magnetic medium, for example, a floppy disk, a hard disk, or a magnetic tape, may be an optical medium, for example, a digital video disc (DVD), or may be a semiconductor medium, for example, a solid state drive (SSD).

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method, performed by a first computing device, and the method comprising:

obtaining first information, wherein the first information indicates to a second computing device to display a first image, the first information comprises a drawing instruction, and the drawing instruction is used to render first to-be-rendered data to obtain the first image;

determining whether the first to-be-rendered data was previously sent by the first computing device to the second computing device;

determining, based on a sending record, indication information of the first to-be-rendered data based on whether the first to-be-rendered data was previously sent by the first computing device to the second computing device, wherein the indication information comprises a first indication or a second indication, the first indication identifies that the first to-be-rendered data was previously sent by the first computing device to the second computing device, the second indication identifies compressed data that is of the first to-be-rendered data and that is currently sent by the first computing device to the second computing device, the sending record indicates to-be-rendered data that has been sent by the first computing device to the second computing device, and wherein determining the indication information of the first to-be-rendered data comprises:

obtaining an identifier of the first to-be-rendered data; and determining the indication information by comparing the identifier of the first to-be-rendered data with one or more identifiers of to-be-rendered data comprised in the sending record; and sending second information to the second computing device, wherein the second information comprises the drawing instruction and the indication information.

2. The method according to claim 1, wherein determining the indication information by comparing the identifier of the first to-be-rendered data with the one or more identifiers of to-be-rendered data comprised in the sending record comprises:

when the sending record comprises the identifier of the first to-be-rendered data, comprising the identifier of the first to-be-rendered data in the indication information.

3. The method according to claim 1, wherein determining the indication information by comparing the identifier of the first to-be-rendered data with the one or more identifiers of to-be-rendered data comprised in the sending record comprises:

when the sending record does not comprise the identifier of the first to-be-rendered data, determining, based on an identifier of second to-be-rendered data comprised in the sending record, differential data between the first to-be-rendered data and the second to-be-rendered data, and comprising the identifier of the second to-be-rendered data and the differential data in the indication information.

4. The method according to claim 3, further comprising:

after sending the second information to the second computing device, updating the sending record to comprise the identifier of the first to-be-rendered data.

5. The method according to claim 1, wherein determining the indication information by comparing the identifier of the first to-be-rendered data with the one or more identifiers of to-be-rendered data comprised in the sending record comprises:

when the sending record does not comprise the identifier of the first to-be-rendered data, compressing the first to-be-rendered data to obtain the compressed data, and comprising the compressed data in the indication information.

6. The method according to claim 1, wherein the first to-be-rendered data comprises texture data.

7. The method according to claim 1, wherein the first to-be-rendered data comprises vertex data.

8. The method according to claim 1, wherein the first to-be-rendered data comprises texture data and vertex data.

9. A method, performed by a second computing device, and the method comprising:

receiving second information sent by a first computing device, wherein the second information indicates to the second computing device to display a first image, the second information comprises a drawing instruction and indication information, the indication information comprises a first indication or a second indication, the first indication identifies first to-be-rendered data previously sent by the first computing device to the second computing device, and the second indication identifies compressed data that is of the first to-be-rendered data and that is currently sent by the first computing device to the second computing device;

obtaining the first to-be-rendered data based on the indication information;

rendering the first to-be-rendered data based on the drawing instruction to obtain the first image; and displaying the first image;

wherein when the indication information comprises the identifier of the first to-be-rendered data, obtaining the first to-be-rendered data based on the indication information comprises:

obtaining the first to-be-rendered data based on the identifier of the first to-be-rendered data and a receiving record, wherein the receiving record indicates to-be-rendered data that has been previously received by the second computing device and that has been previously sent by the first computing device; and wherein when the indication information comprises an identifier of second to-be-rendered data and differential data of the second to-be-rendered data, obtaining the first to-be-rendered data based on the indication information comprises:

obtaining the second to-be-rendered data based on the identifier of the second to-be-rendered data and the receiving record; and obtaining the first to-be-rendered data based on same data in the second to-be-rendered data and the first to-be-rendered data and the differential data, wherein the first to-be-rendered data comprises the differential data and the same data.

10. The method according to claim 9, wherein when the indication information comprises the compressed data, obtaining the first to-be-rendered data based on the indication information comprises:

decompressing the compressed data to obtain the first to-be-rendered data.

11. The method according to claim 9, wherein the first to-be-rendered data comprises vertex data.

12. The method according to claim 9, wherein the first to-be-rendered data comprises texture data and vertex data.

13. An apparatus, comprising:

at least one processor; and a memory coupled to the at least one processor and storing programming instructions for execution by the at least one processor to cause the apparatus to:

obtain first information, wherein the first information indicates to a second computing device to display a first image, the first information comprises a drawing instruction, and the drawing instruction is used to render first to-be-rendered data to obtain the first image;

determine indication information of the first to-be-rendered data based on whether the first to-be-rendered data was previously sent by the apparatus to the second computing device, wherein the indication information comprises a first indication or a second indication, the first indication identifies the first to-be-rendered data previously sent to the second computing device, and the second indication identifies compressed data that is of the first to-be-rendered data and that is currently sent to the second computing device, wherein a sending record indicates to-be-rendered data that has been sent by the first computing device to the second computing device, and wherein determining the indication information of the first to-be-rendered data comprises:

obtaining an identifier of the first to-be-rendered data; and determining the indication information by comparing the identifier of the first to-be-rendered data with one or more identifiers of to-be-rendered data comprised in the sending record; and send second information to the second computing device, wherein the second information comprises the drawing instruction and the indication information.

14. The apparatus according to claim 13, wherein execution of the programming instructions by the at least one processor causes the apparatus to:

when the sending record comprises the identifier of the first to-be-rendered data, comprise the identifier of the first to-be-rendered data in the indication information.

15. The apparatus according to claim 13, wherein execution of the programming instructions by the at least one processor causes the apparatus to:

when the sending record does not comprise the identifier of the first to-be-rendered data, determine, based on an identifier of second to-be-rendered data comprised in the sending record, differential data between the first to-be-rendered data and the second to-be-rendered data, and comprise the identifier of the second to-be-rendered data and the differential data in the indication information.

16. The apparatus according to claim 15, wherein execution of the programming instructions by the at least one processor further causes the apparatus to:

update the sending record to comprise the identifier of the first to-be-rendered data.

17. The apparatus according to claim 13, wherein execution of the programming instructions by the at least one processor causes the data processing apparatus to:

when the sending record does not comprise the identifier of the first to-be-rendered data, compress the first to-be-rendered data to obtain the compressed data, and comprise the compressed data in the indication information.

18. The apparatus according to claim 13, wherein the first to-be-rendered data comprises texture data.

19. The apparatus according to claim 13, wherein the first to-be-rendered data comprises vertex data.

* * * * *